(12) United States Patent
Fortier

(10) Patent No.: US 7,728,692 B2
(45) Date of Patent: Jun. 1, 2010

(54) REDUCTION OF NOISE IN A METALLIC CONDUCTOR SIGNAL PAIR USING CONTROLLED LINE BALANCING AND COMMON MODE IMPEDANCE REDUCTION

(75) Inventor: John Fortier, Rochester, NY (US)

(73) Assignee: Accell Systems, Inc., Framingham, MA (US)

( * ) Notice: Subject to any disclaimer, the term of this patent is extended or adjusted under 35 U.S.C. 154(b) by 389 days.

(21) Appl. No.: 11/811,143

(22) Filed: Jun. 8, 2007

(65) Prior Publication Data

US 2008/0012658 A1    Jan. 17, 2008

Related U.S. Application Data

(60) Provisional application No. 60/812,211, filed on Jun. 9, 2006.

(51) Int. Cl.
*H04B 3/28* (2006.01)
*H03H 7/38* (2006.01)

(52) U.S. Cl. .................. 333/12; 333/5; 333/17.3; 333/24 R; 333/32

(58) Field of Classification Search .......... 333/4, 333/5, 12, 17.3, 24 R, 32
See application file for complete search history.

(56) References Cited

U.S. PATENT DOCUMENTS

| 4,191,155 | A | * | 3/1980 | Nishio et al. ............... 123/633 |
| 5,095,291 | A | * | 3/1992 | Staschover et al. ........... 333/12 |
| 5,109,206 | A | * | 4/1992 | Carlile ....................... 333/12 |
| 6,097,262 | A | * | 8/2000 | Combellack ................. 333/12 |
| 6,917,255 | B2 | * | 7/2005 | Mathias et al. ............... 333/25 |

* cited by examiner

*Primary Examiner*—Robert Pascal
*Assistant Examiner*—Kimberly E Glenn
(74) *Attorney, Agent, or Firm*—Wilmer Cutler Pickering Hale and Dorr LLP

(57) ABSTRACT

In order to reduce noise on twisted metallic pair signal conductors, circuits are disclosed in which the signal balance between the wires of the pair is significantly improved, thereby reducing the line's susceptibility to external electromagnetic interference and equally reducing its ability to radiate signals into the surrounding medium. Further, the common mode impedance of the wire pair as seen at or close to the junction with the terminating equipment is controlled in order to reduce the ability of signals external to the wire pair to couple into the wire. This reduces noise in the line, as perceived by connected equipment, leading to an increase in the data carrying capacity of the line and the usable length of the line carrying such data.

11 Claims, 10 Drawing Sheets

Line balancing
circuit with preset impedance

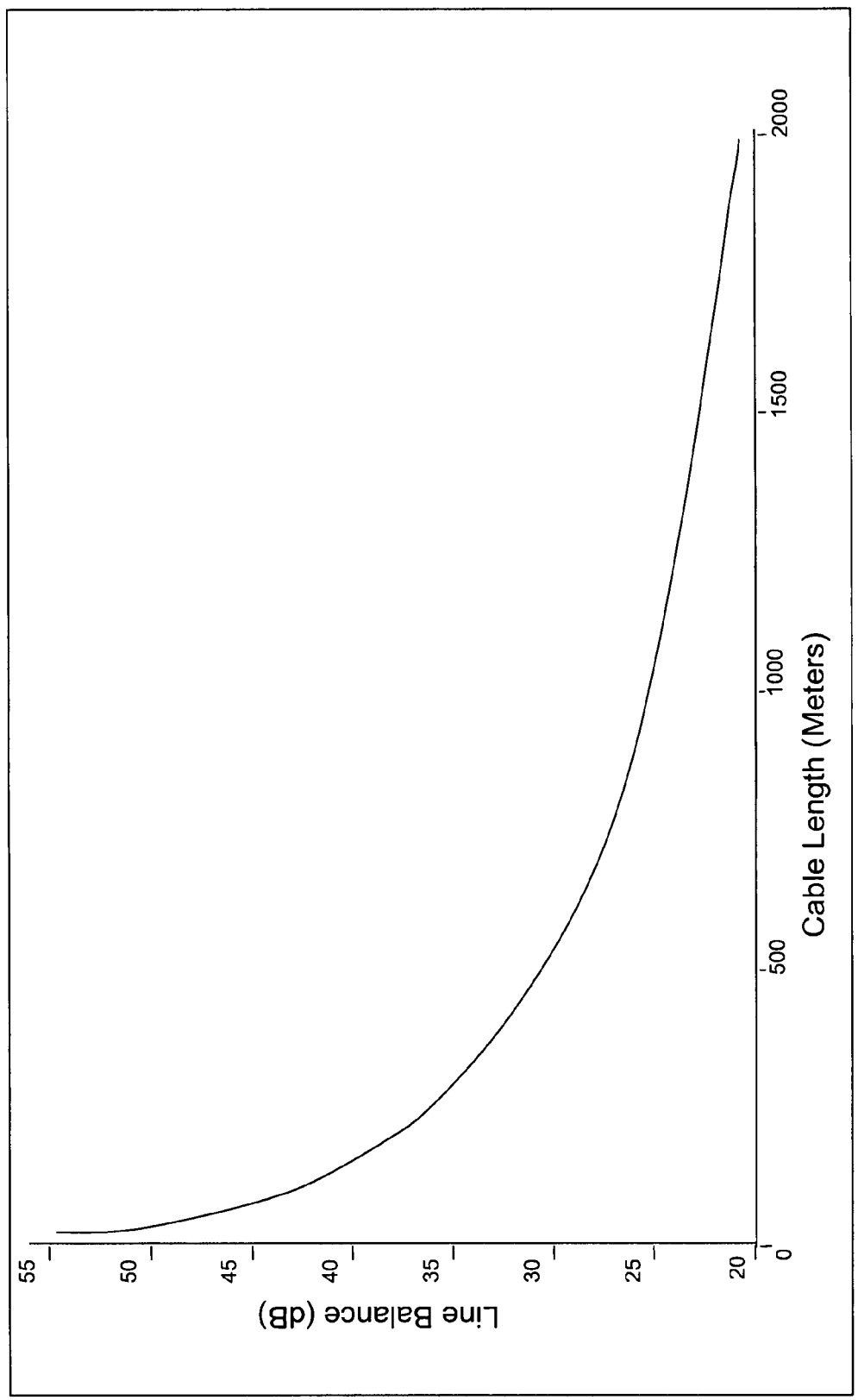
Figure 1 - Line Balance Versus Cable Length.

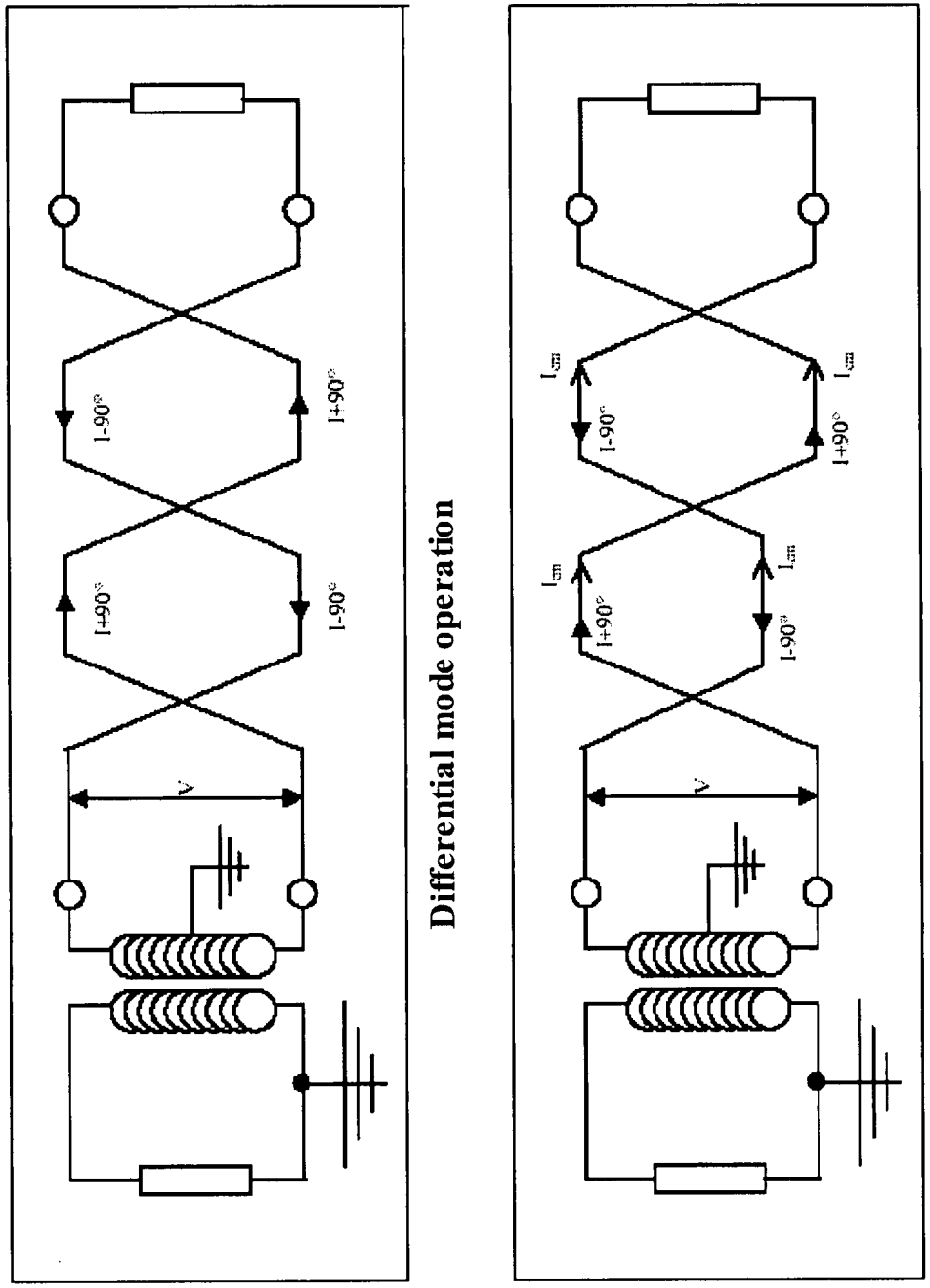
Figure 2 – Differential to common mode conversion by line unbalance

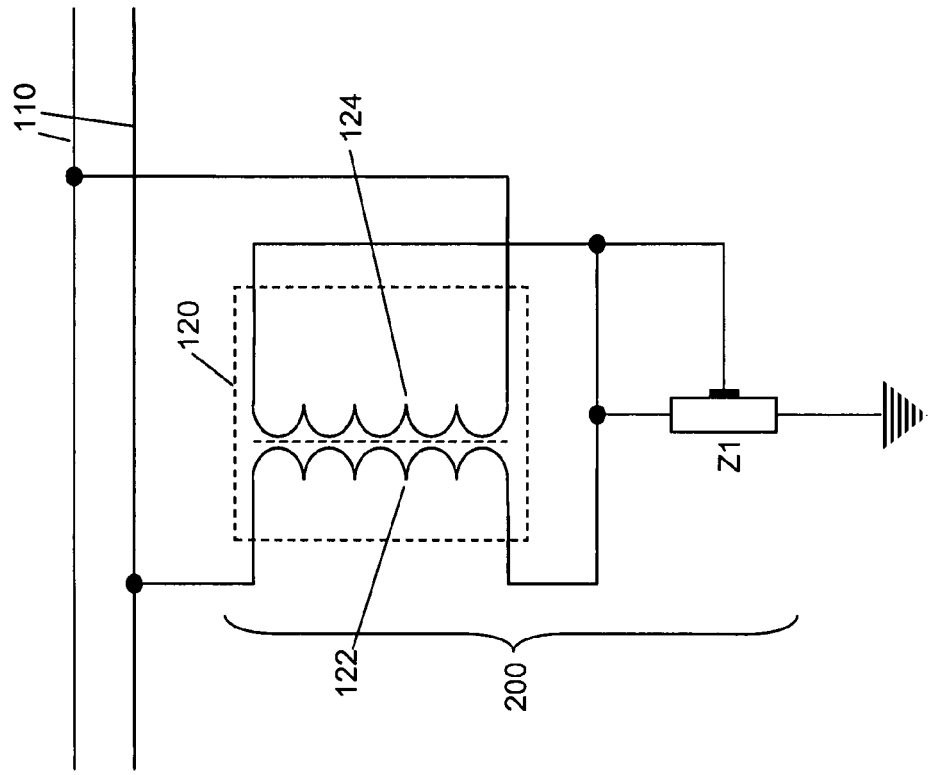
Figure 4 – Line balancing circuit with manually adjustable impedance
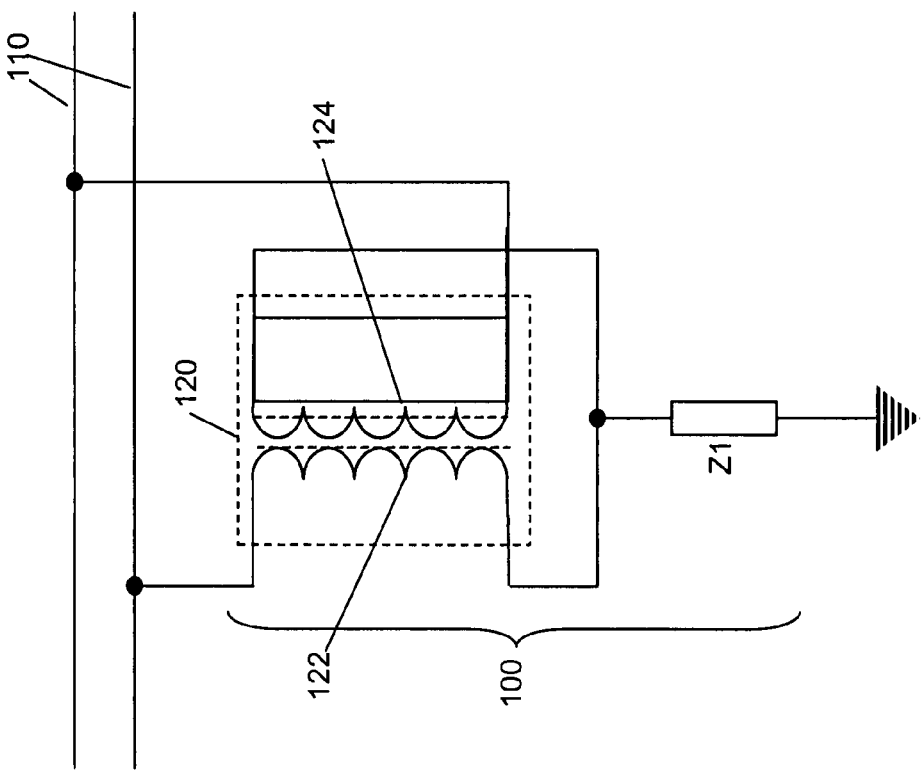
Figure 3 – Line balancing circuit with preset impedance

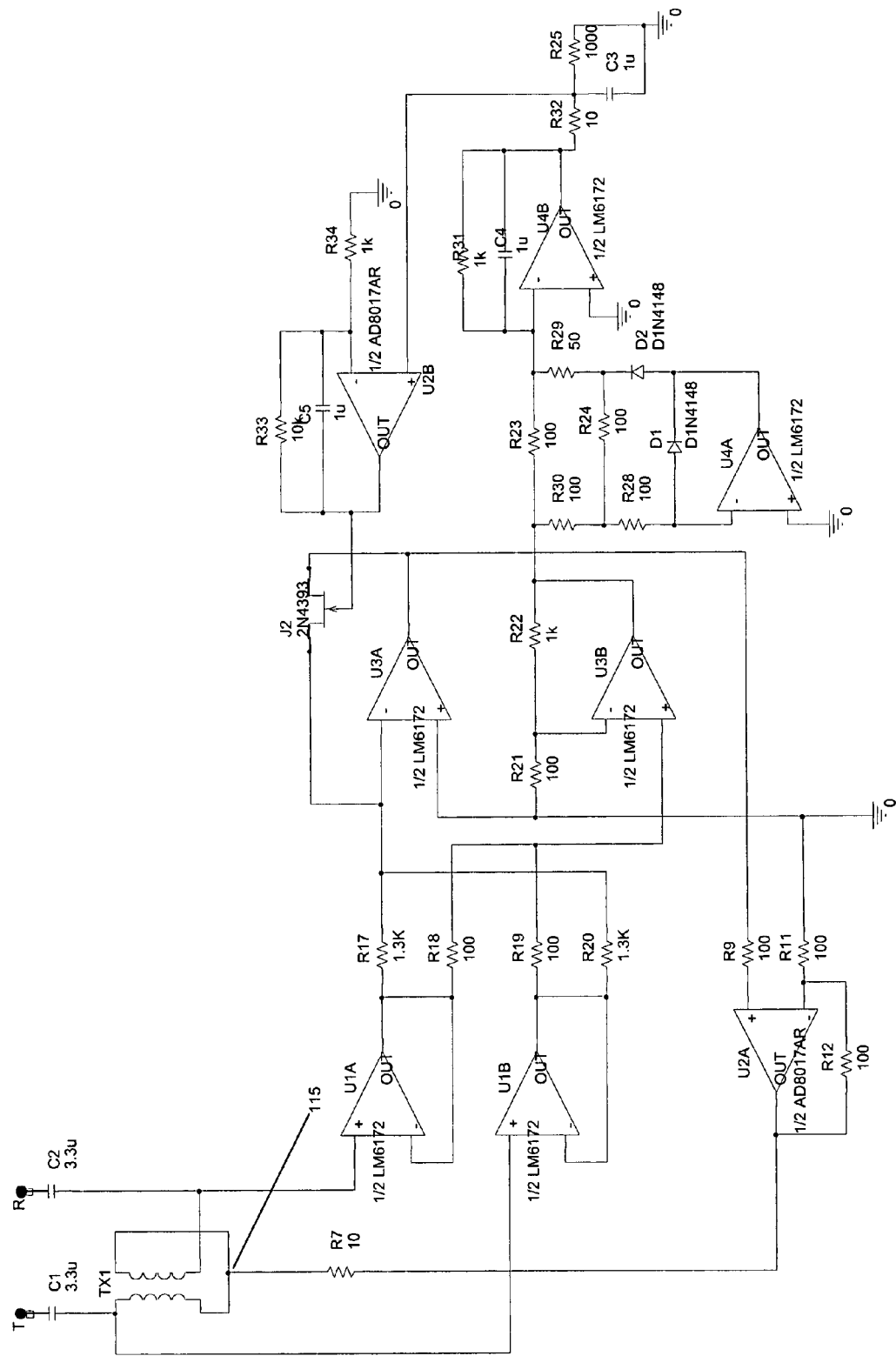
Figure 5 – Automatic line balance with internally generated control voltage

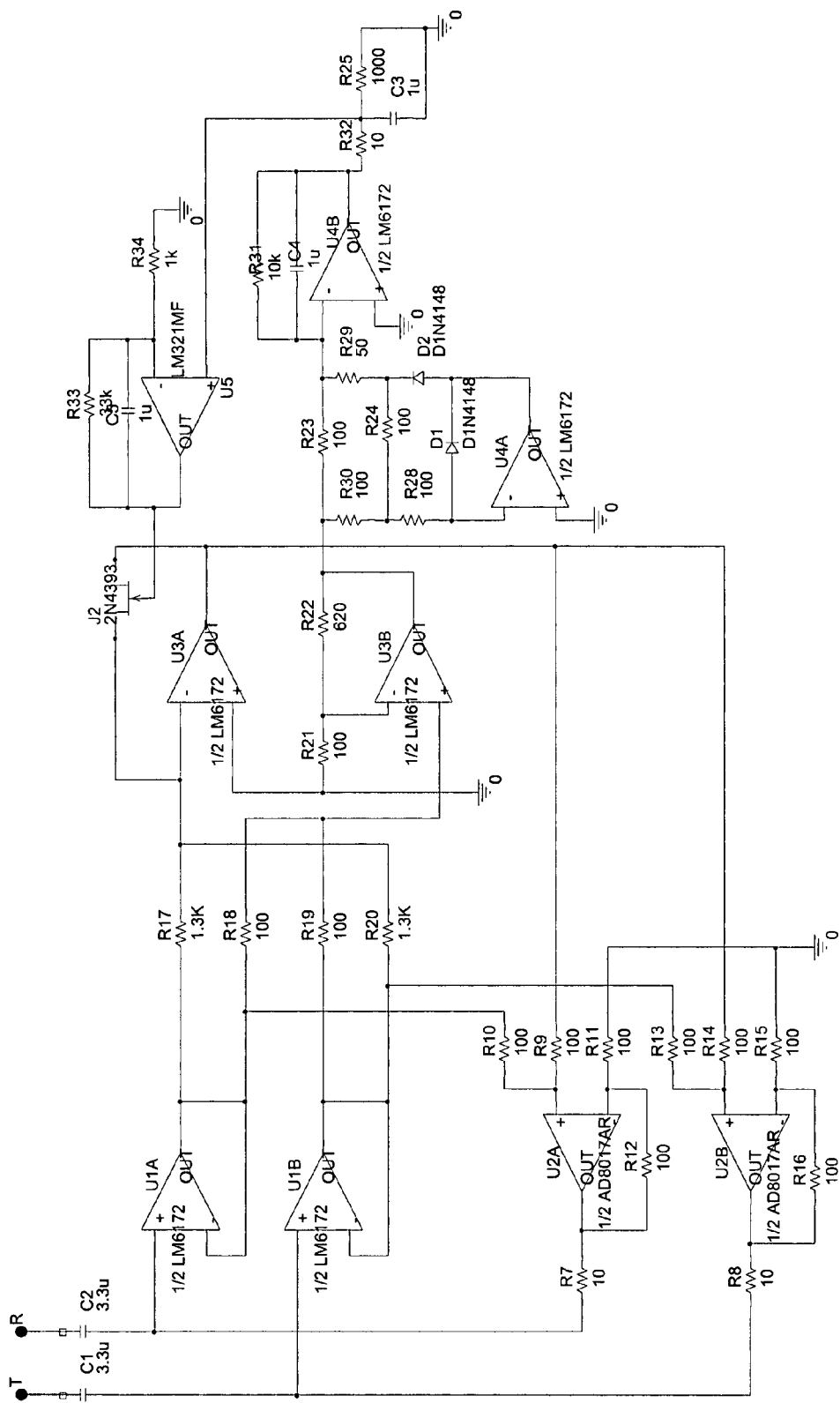
Figure 6 – Automatic, transformerless line balance with internally generated control voltage

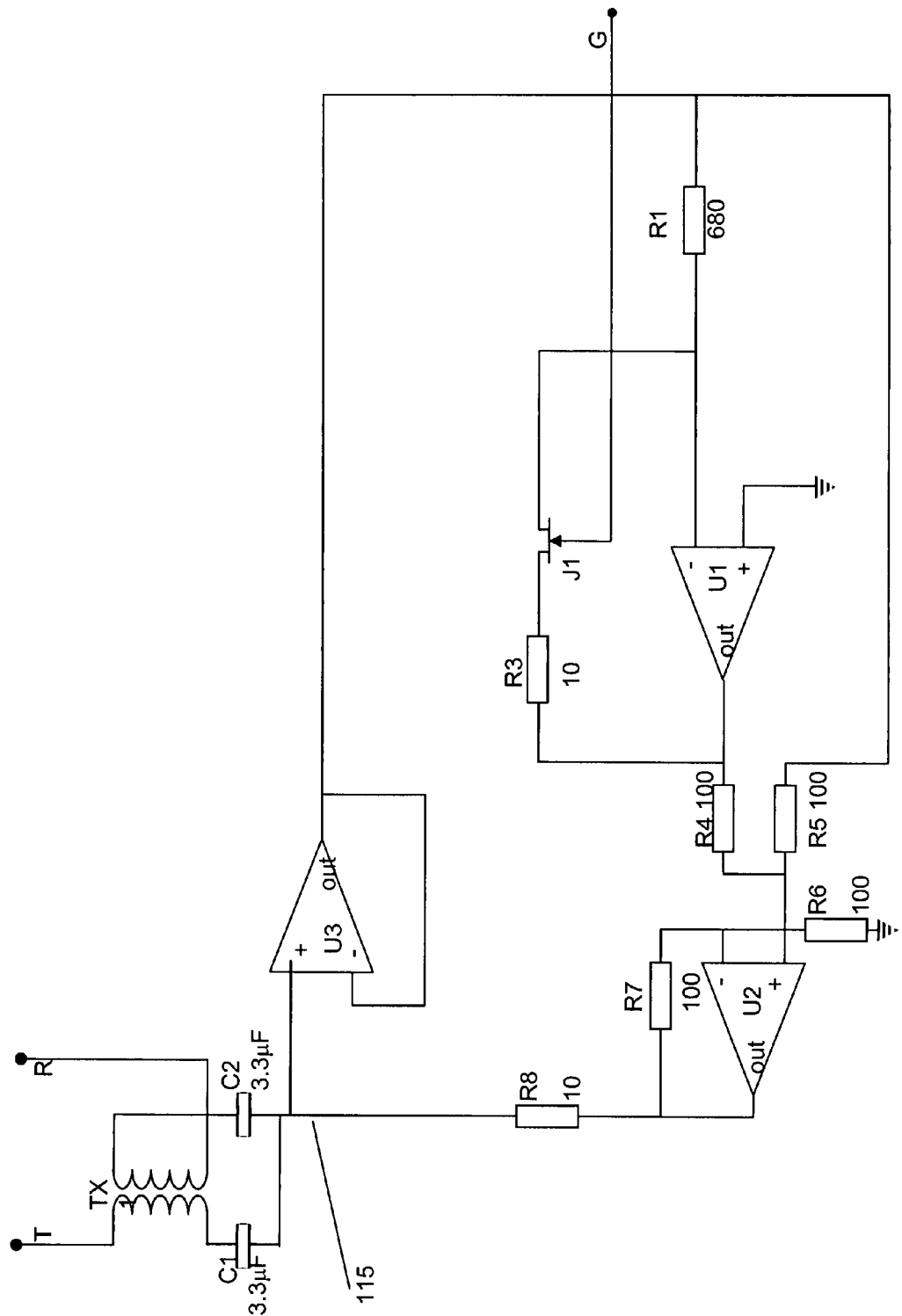
Figure 7 – Automatic line balance with externally generated control voltage

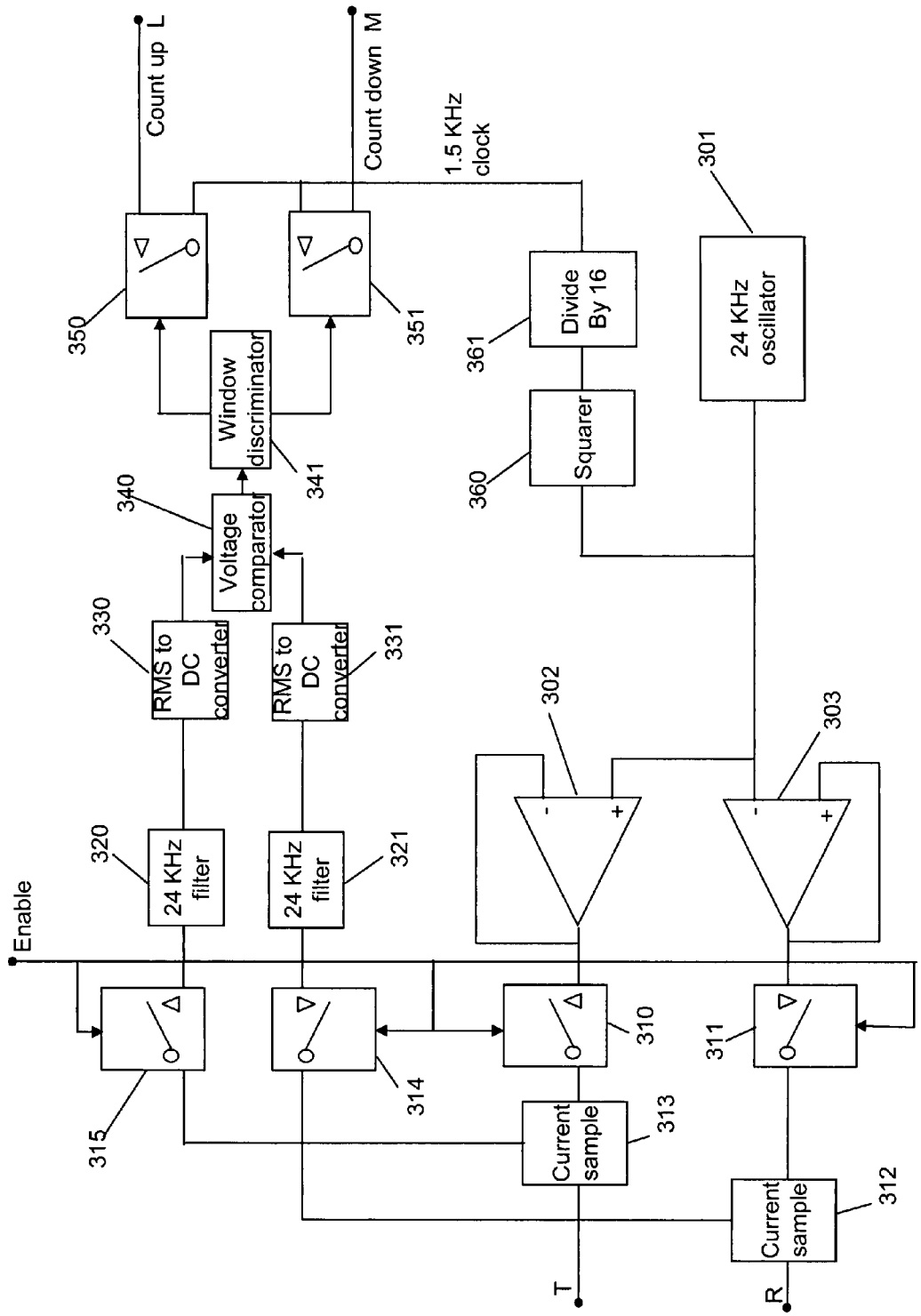
Figure 8 – External control voltage generation, stage 1

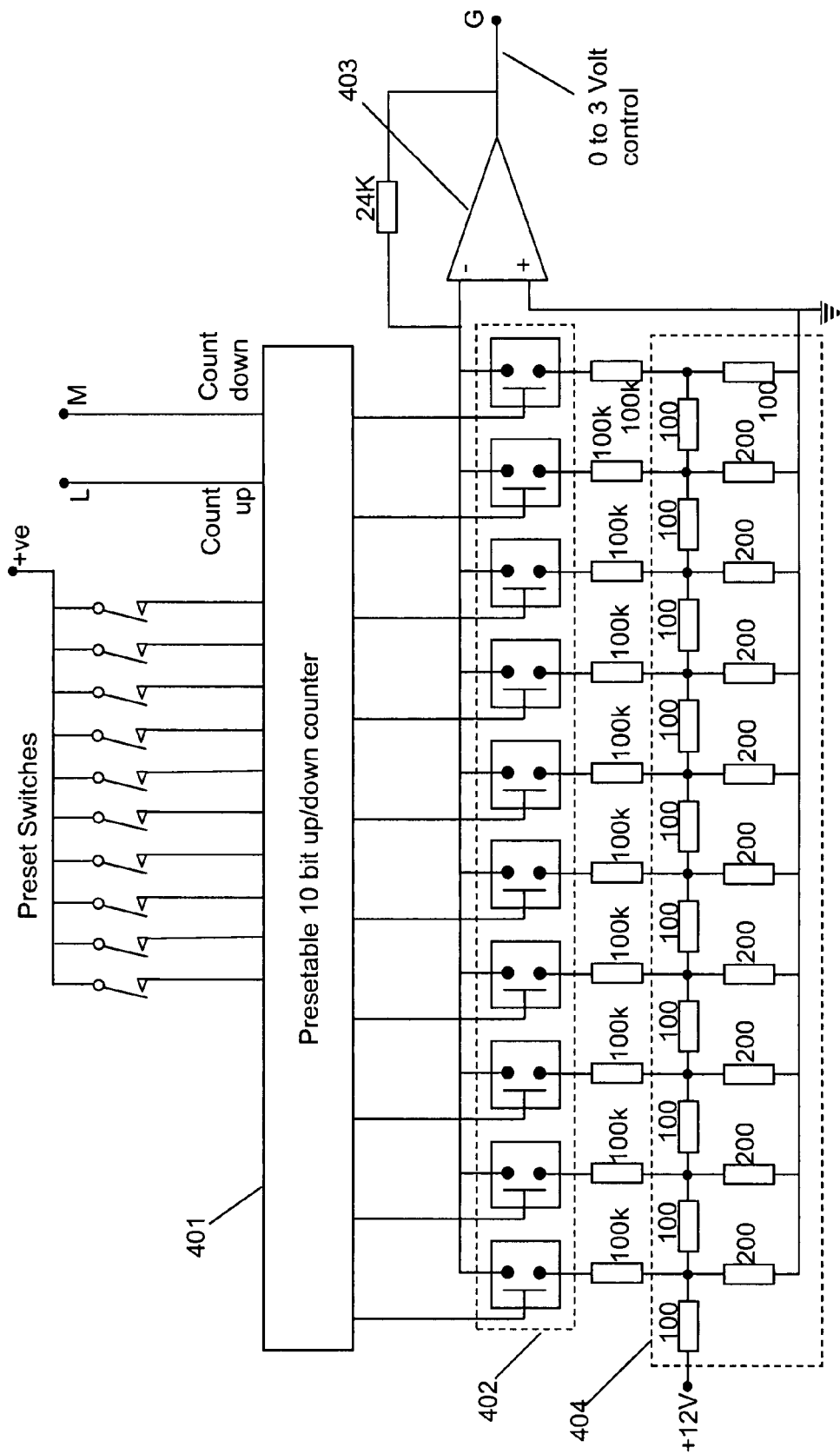
Figure 9 – External Control voltage generation, stage 2

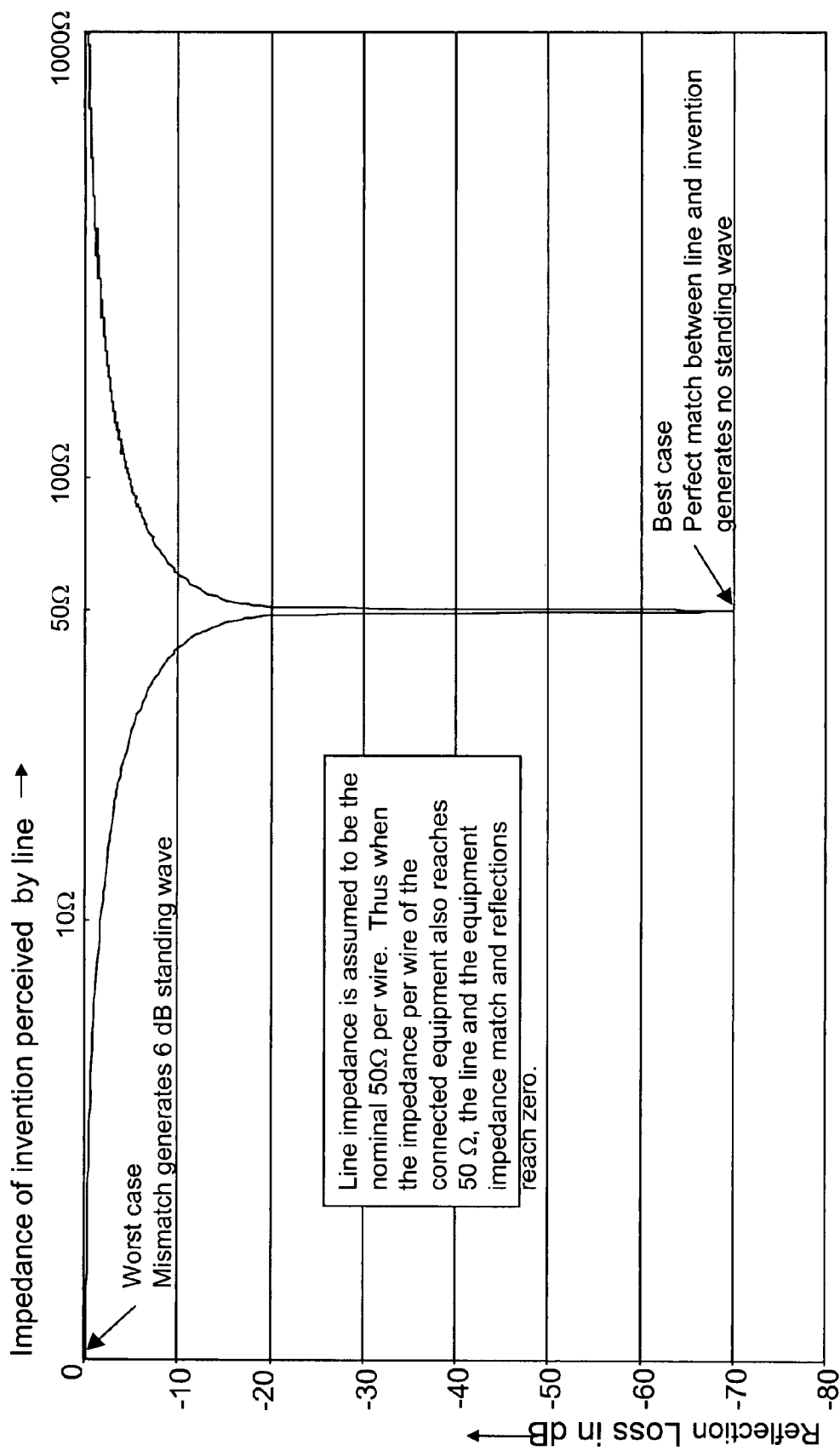
Figure 10 - Reflection loss against line impedance match

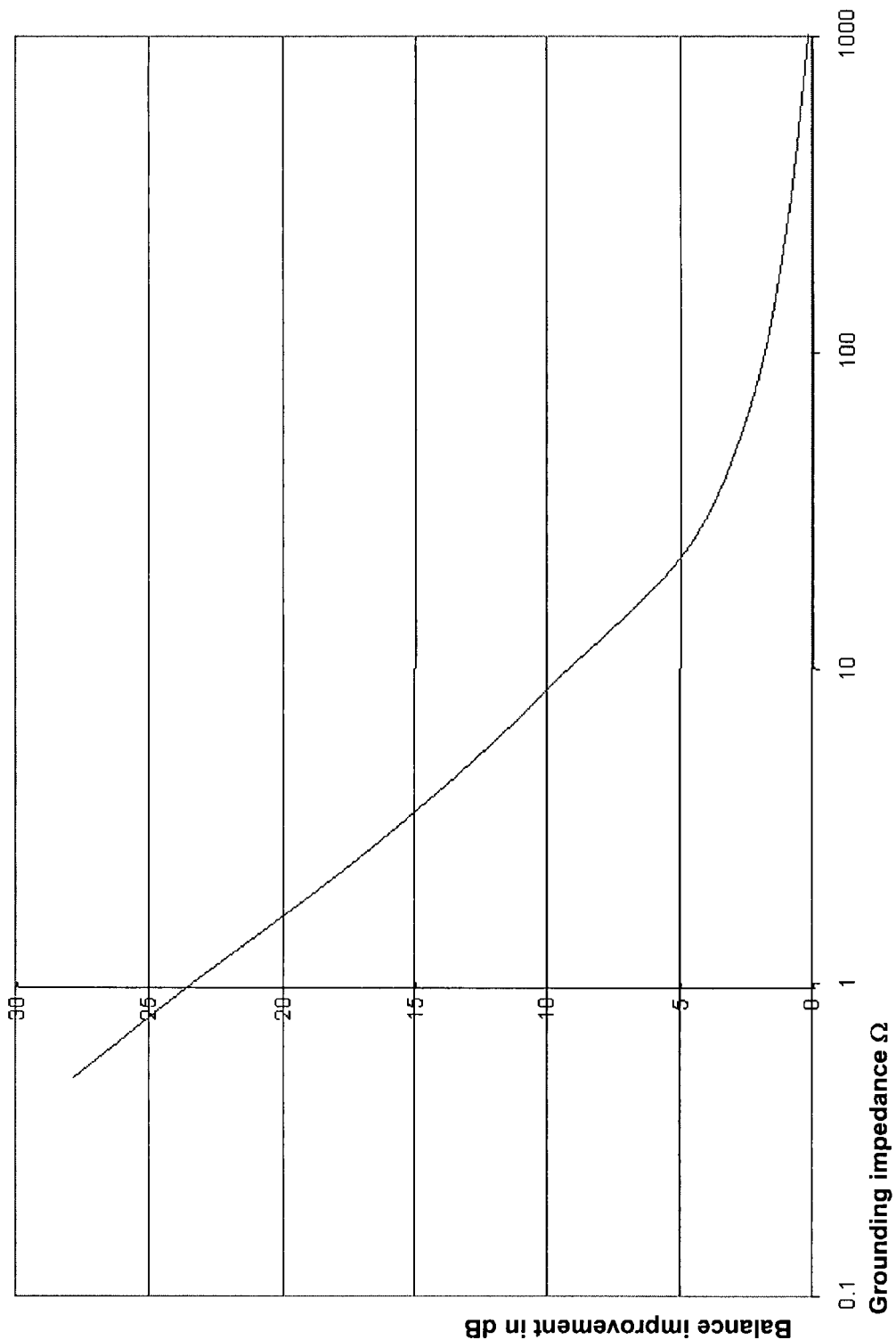
Figure 11 – line balance improvement in dB against grounding impedance

REDUCTION OF NOISE IN A METALLIC CONDUCTOR SIGNAL PAIR USING CONTROLLED LINE BALANCING AND COMMON MODE IMPEDANCE REDUCTION

CROSS-REFERENCE

This Application claims the benefit of U.S. Provisional Patent Application 60/812,211, filed Jun. 9, 2006.

BACKGROUND OF THE INVENTION

Digital Subscriber Line (DSL) is a technology that enables broadband signals, providing services such as high speed internet access, video-on-demand and real time video conferencing, to be transmitted over ordinary telephone lines from the providers' centrally located DSL Access Module (DSLAM) to DSL modems located at the customer premises.

However, since the inception of DSL, a major limitation on its performance has been the presence of noise in the telephone line over which it operates. Noise combines with the wanted DSL signal and reduces the ability of the receiving modem to demodulate the incoming signal.

Shannon's law (C=W log 2(1+S/N), where C is the channel capacity in bits per second, W is the bandwidth in hertz, and S/N is the signal-to-noise ratio, shows that any increase in noise decreases the data carrying capacity of the signal. Therefore, the inverse is also true; any device or method which reduces the amount of noise in the line or in any of the metallic connectors that make up the connection between the DSLAM and modem, will improve the ability of the system to transfer data.

Noise has several sources, both external and internal to the telephone line over which the wanted signal is transmitted. Since it is normal practice to gather the individual conductor pairs together into a cable bundle, a major cause of noise is the cross coupling of the signal in one pair within the cable into other pairs in the same cable. This is the phenomenon known as crosstalk. Also, external electromagnetic noise will be coupled into all the pairs in the cable. A third source of noise is that which occurs within the customer premises and is sometimes caused by the operation of household appliances, air conditioners, etc. This noise is known as "impulse" noise.

Within the DSL community, noise has been accepted as endemic and little attempt has been made to reduce its presence in the conductor wires. In fact, much time, money and ingenuity has gone into finding ways to make DSL operate more efficiently in the presence of noise. There remains a need however for a system that provides a means whereby noise in the wire pairs may be substantially reduced, thereby improving the transmission of data, according to Shannon's law.

PRIOR ART

U.S. Pat. No. 6,097,262 (Combellack) is entitled Transmission Line Impedance Matching Apparatus. FIG. 3 of Combellack discloses what Combellack calls an impedance matching device. This device includes two terminating correctors and a mid-line corrector. FIG. 5 of Combellack discloses circuitry for the mid-line corrector. Although Combellack does not explicitly disclose a value for the resistor RG shown in FIG. 5, Combellack in effect teaches that the proper value for this resistor is 25 Ohms. This is because the currents through the windings of the transformer combine when passing through this resistor, causing twice the current to flow through the resistor as might be the case if only one wire were attached to the resistor through a transformer winding, causing it, in turn to appear to the signal on each wire as though it were twice its intrinsic value, raising its apparent resistance to 50Ω, the theoretical impedance of each wire of a 100Ω pair Additionally, Combellack states that an imperfectly matched terminating impedance on a line will cause reflections and standing waves but does not explain how this phenomenon exacerbates noise on the line or how the provision of a matching impedance will mitigate it.

Further, Combellack describes how his tests were undertaken, not in a laboratory or using real world wire pairs carrying realistic signals but as a model in Pspice simulation software. Pspice models, unless deliberately programmed to do otherwise, provide perfect simulated components. Thus the computer simulated twisted pair transmission line used by Combellack would have been perfectly balanced with completely equal differential signals in each wire of the pair. As is well known to practitioners of the art of transmission of signals in the medium of twisted pairs, such a completely balanced line does not, in the real world, exist, since manufacturing faults, installation twists and bends in the wire pair and inequalities in the impedance between each wire of the pair and ground all contribute to inequalities in the parameters of the individual wires of the pair, leading to pair unbalance. None of this is described or considered in Combellack's patent.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

FIG. 1 shows a graph of line balance versus cable length.

FIG. 2 shows the creation of common mode signals from differential mode signals caused by line unbalance.

FIG. 3 shows a circuit constructed in accordance with the invention.

FIG. 4 shows a manually adjustable circuit constructed in accordance with the invention.

FIG. 5 shows an automatically adjustable circuit constructed in accordance with the invention.

FIG. 6 shows an automatically adjusting circuit constructed in accordance with the invention in which the transformer used in the circuits shown in FIGS. 3 to 5 is replaced by other electronic components.

FIG. 7 shows another automatically adjusting circuit constructed in accordance with the invention in which the controlling voltage is externally generated.

FIG. 8 shows a first stage of a circuit for generating the externally generated control voltage used in the circuit shown in FIG. 7.

FIG. 9 shows a second stage of a circuit for generating the externally generated control voltage used in the circuit shown in FIG. 7.

FIG. 10 shows a graph of reflection loss at a line terminal against the degree of match between the line impedance and the terminal impedance.

FIG. 11 shows the amount of line balance achieved by circuits built according to the invention against the grounding impedance used by the circuit.

DESCRIPTION OF INVENTION

Background

This invention is in the field of telecommunications and involves metallic pair conductors. Such conductors are used to carry signals such as DSL broadband signals, voice signals and any other information containing signals that can be transmitted over a pair of metallic, usually copper, conductors.

Such signal carrying conductor pairs are normally insulated using polyvinyl chloride or similar plastic insulation and twisted into a double helix in order to reduce the ability of external electromagnetic disturbances from coupling into the line pair in differential mode.

Because, with the pair twisted, any external interferer whose wavelength is several times the twist length will affect both wires of the pair equally, any signal coupled into one wire during any half twist will be coupled equally into the other wire during the subsequent half twist, and the overall effect on the differential signal between the wires will be extremely small.

However, this twisting has little or no affect on the ability of external signals to couple into the pair in common mode, that is, a conduction mode where both wires of the pair are affected equally and such coupled signals move in the same direction at any one time in both wires of the pair.

In present day broadband installations, wanted signals are transmitted along the wire pair in balanced differential mode, with common mode blocks, which allow the passage of differential mode signals relatively unimpeded, being placed at the wire pair ends to prevent any common mode interference from reaching the connected equipment, but allowing the wanted, differential, information carrying signal to reach the connected equipment.

The ability of the twisted pair metallic line ("line") to carry signals without either being subject to the ingress of external electrical interference or radiating its own signal into the surrounding medium depends, to a large extent, on the balance of the line. In a correctly balanced line, the wires in the pair present an identical impedance to electrical signals within them and an identical impedance to ground. Any difference in either one of these, say 49 ohms versus 50 ohms, will cause the line to become unbalanced.

In an unbalanced line, the signal in one of the wires of the pair, while in antiphase to the signal in the other wire, will be of a greater or lesser amplitude than the signal in the other wire of the pair. This will have the effect of parasitically generating a common mode signal within the wire pair, the amplitude of the common mode signal being the antiphase sum of the signals in each wire of the pair. For example, if one wire is carrying a signal with an amplitude of 1.01 RMS volts amplitude and the other wire is carrying a signal of 0.99 volts RMS amplitude, the resultant common mode signal will have an amplitude of 20 millivolts RMS.

Line balance is measured in decibels, following the formula $B=20 \log (Va-Vb/Va+Vb)$, In the above case, this gives a line balance of 40 dB, which is considered to be a relatively well balanced line for voice but insufficiently well balanced for DSL, where a line balance of 50 dB is considered a requirement. However, line unbalance builds up as the line lengthens, so a longer line will, under normal circumstances, be less balanced than a short line.

This is illustrated in FIG. 1, Line Balance Versus Cable Length. As shown in FIG. 1, line balance decreases exponentially with increases in cable length. Line balance is a measure of the line's susceptibility to differential to common mode signal conversion. Line balance is measured by sending a signal down the twisted pair and measuring the amount of conversion to common mode at the far end of the pair. In other words, it measures the amount of differential mode to common mode conversion. As shown in FIG. 1, at two kilometers, a line has lost 34 dB of balance.

It should also be noted that a line balance figure is applied to a set length of line, so that a line has, for example, a balance of 30 dB per kilometer. It will be noticed in FIG. 1 that after 2 kilometers the line balance has decreased to 21 dB, a fairly severe unbalance, equating to 16%. Such imbalance could lead to severe crosstalk and susceptibility to both external electrical noise and to radiation from the wire pair.

This is illustrated in FIG. 2: Generation of Parasitic Common Mode Signals. This shows how, in a perfectly balanced line, as shown in the upper drawing, common mode signals are not generated and the signal remains a pure differential mode signal. However, as shown on the lower drawing, any line unbalance will generate common mode signals that will be applied equally to the load. Since, in common mode, the signal amplitude and phase are exactly equal at both ends of the load, the load appears as an infinite impedance to these signals. It follows, therefore, that any means that can balance the signals on the line will prevent or reduce the formation of common mode signals.

Circuits constructed according to the invention can improve the balance of the line to which they are attached.

Line unbalance is one aspect of present day telephone line installations which make them an imperfect media for the transmission of xDSL, that is, various flavors of DSL such as ADSL, ADSL2, ADSL2 Plus, VDSL and VDSL2. A further problem stems from the method used to protect connected equipment from high voltage events on the line.

Telephone lines are susceptible to external electromagnetic influences. These may be nearby lightning strikes, amateur radio transmissions, AM radio, electrical welding or even a badly suppressed car ignition. However, one of the worst interferers is "mains hum".

If telephone lines run collinear to high voltage electrical distribution lines, which will operate at above 10 kilovolts and at frequencies of 50 or 60 hertz, a small part of the energy carried in the power distribution wires will be coupled into the telephone line pairs in common mode. Line unbalance will convert part of this to a mains frequency differential signal on the line. This will have the effect of severely interfering with the operation of connected equipment.

Mains hum, coupled into an unbalanced line, will be partially converted to differential mains hum by line unbalance. Mains hum voltages on real lines have been measured at over 100 volts. Thus, an unbalanced line will convert part of this to differential mode interfering noise. If, for example, the line has 30 dB of balance, the resultant differential mode interference on the line will be 3.1 volts according to the line balance equation, $B=20 \log 10((Z1-Z2)/(Z1+Z2))$, where B=Line balance in dB and Z1 and Z2 are the impedances of the line and termination, Z1 always being the greater of the two. This level of line unbalance will occur if, for example, the impedance of one wire is 51Ω and the impedance of the other is 48Ω. This will be enough to cause severe distortion of any wanted signals on the line. Higher voltages and worse line balance will simply exacerbate this effect. Also, the differential mains hum engendered by line unbalance may reach voltages high enough to begin to saturate the transformers customarily used to protect the connected equipment from common mode voltages on the line.

All these effects obviously have a negative impact on connected equipment and on the signals passing on the line.

Other forms of interference may be at frequencies or voltages that will directly affect the connected equipment. Examples of such interference are AM radio broadcasts, welding, badly suppressed car ignitions, etc. In fact, any source of electromagnetic interference (EMI) will couple into the line. Since this interference may, after conversion from common mode to differential mode by line unbalance, actually appear at frequencies used by the connected equipment, its presence in the line is directly destructive to the wanted signals.

Circuits constructed according to the invention can also be used to mitigate or eliminate the presence of external interference on the line.

Several prior inventions have attempted to reduce noise in the line by terminating the line in common mode with an impedance which is a close match to the line common mode impedance, notably Combellack, noted above. The idea behind these devices is that a matching impedance will absorb all common mode signals and prevent reflections from the line terminals, these reflections leading to common mode standing waves in the line.

However, these devices have not been adopted generally or even in specialized circumstances due to their minimal affect with regard to noise reduction.

The apparent attractiveness of approaches like Combellack's becomes clear when considering the following:

Present day installation practice with regard to xDSL requires the use of an isolating transformer or choke (sometimes both) to protect the connected equipment from high voltage events on the line.

This transformer or choke provides a means whereby common mode signals are blocked from the connected equipment, while differential signals are passed with little attenuation.

However, while this installation practice may (at least partially) protect the equipment from high voltage line events, it also has the effect of exacerbating both the level of common mode signal on the line and its capability to cross-couple between wire pairs in a cable bundle Any common mode signal coupled into a wire pair in a multi-pair cable will propagate down the cable until it reaches the cable ends. At a cable end it will encounter the common mode block of a terminating transformer and be reflected back into the cable pair, again in common mode. Where the incident signal waves and the reflected signal waves come together, standing waves will result as the incident, and reflected waves combine both constructively and destructively.

A standing wave is a wave that oscillates but does not propagate. The simplest case is produced by a superposition of two sinusoidal waves of the same frequency traveling in opposite directions $$\psi_1 = A\cos(\omega t - kx) + B\sin(\omega t - kx)$$

$$\psi_2 = A\cos(\omega t + kx) + B\sin(\omega t + kx).$$

Their sum is then $$\psi = \psi_1 + \psi_2$$

$$= 2[A\cos(\omega t) + B\sin(\omega t)]\cos(kx)$$

At current nodes, the incident and reflected voltage waves will be subtracted from each other to zero, while at voltage nodes, they will sum, producing a higher voltage than either incident or reflected wave by themselves. In the case of common mode signals reflecting from the high impedance termination of a common mode block at the termination of the telephone line, the incident and reflected waves will form voltage standing waves of decreasing amplitude as they occur further from the line termination. This is due to the attenuation of the reflected wave as it propagates through the line in the reverse direction to the incident wave. However, since common mode signals attenuate relatively slowly with increasing distance, standing waves may form over a large portion of the cable.

However, near the line termination, the amplitude of the reflected waves is effectively the same as the incident waves and the summed, standing wave, voltage levels will be almost twice the amplitude of the incident wave, an increase of 6 dB.

It should be borne in mind, however, that, while this phenomenon may produce standing waves of 6 dB greater amplitude than the incident wave, rebalancing the line in accordance with the invention can and will reduce the ability of the line convert these signals to differential signals by over 20 dB. Thus, line balancing has a far greater effect on the reduction of noise in a twisted pair line than terminating the line with its correct common mode impedance. The actual impedance to ground experienced by a common mode signal encountering circuits constructed according to the invention will be very low, leading to common mode impedance mismatch. However, the lower the impedance to ground, the greater the achieved line balance. This is shown graphically in FIGS. 10 and 11.

With a circuit constructed according to the invention attached to the line close to or at the DSLAM, the tendency of common mode signals is to flow toward the lower impedance associated with the point where the circuit is connected.

Thus, the common mode noise currents in the line will flow away from the customer and toward the DSLAM. Much of these signals will be grounded by circuits constructed in accordance with the invention, removing the possibility of them converting to differential mode noise. Since the common mode signals have preferentially flowed toward the circuits constructed in accordance with the invention it follows that those portions of these signals that do convert to differential mode noise will, when converted, have further to travel as differential mode signals toward the customer modem and will attenuate further on the way.

This will further reduce the level of noise incident on the receiver of the customer modem and improve the transmission of wanted data, according to Shannon's law.

Circuits constructed according to the invention can also be used to preferentially guide common mode noise signals away from the customer modem.

As can be seen from the above, there are three effects that increase the susceptibility of telephone lines to the generation and ingress of noise.

1. Line unbalance
2. High common mode impedance
3. Converted common mode noise impinging on the customer modem.

Circuits disclosed herein mitigate or eliminate the effects of all three.

In addition to the noise sources described above, the phenomenon of impulse noise exists within the premises to which the line is connected.

The internal telephone wiring of any premises, but particularly that in domestic premises, acts like a remarkably efficient antenna as far as impulse noise is concerned, readily coupling in all the impulse noise occurring in the house and, for that matter, the neighborhood.

Impulse noise was researched as early as the 1960s in the context of telephone networks. It was generally ignored because there was little that could be done to prevent the lightening storms, electric motors and electromechanical relays that caused the impulses.

However, forty years later in the age of modern consumer electronics and the sources of impulse noise have increased to include such items as electric toothbrushes, handheld rotary tools, computer printers, fluorescent lights, electric lawnmowers or hedge clippers and a whole host of other new electrical appliances, used indoors and out. Add to this appliances in use in the 1960s that are still in use today, such as hairdryers, refrigerators, garage door openers and vacuum cleaners, and the level of the problem can begin to be appreciated.

Today, impulse noise's impact has become much more significant. While inaudible, these noise spikes can wreak havoc on data services, causing the IP cyclic redundancy check that requests resends of errored packets of data to operate continuously and even causing the loss of packets entirely.

For internet users, high amounts of impulse noise cause the service to slow down significantly and can cause actual errors in downloaded data. With IPTV service, even low amounts of impulse noise result in video pixelation or breaks in the audio content.

When circuits constructed in accordance with the invention are installed at the customer premises, between the modem and the DSL connected equipment, such as a computer or high definition television, the effects of impulse noise are greatly reduced or virtually eliminated, allowing the DSL circuit to operate at greater efficiency and at higher data rates.

Circuits constructed according to the invention can also be used to reduce the influence of impulse noise on the wanted broadband signal.

Transmitted DSL signals are at their highest amplitude closest to the DSLAM or modem, before the signal is attenuated by the line. Line unbalance, caused by the nature of the wiring in the central office, is also worst at or close to the modem or DSLAM.

The result of this is that conversion of differential signals to common mode noise is prevalent at or close to the central office or remote terminal (used to extend DSL signals to customers who would otherwise be out of reach) and a large portion of crosstalk is generated close to the DSLAM. Tight bends in cable runs, jumper wires in the distribution frame and multiple connections and ports all add to the unbalance of the line, allowing the strong differential mode signals close to the DSLAM to be partially converted to common mode signals.

Common mode signals will propagate down the line, converting to differential mode noise by line unbalance. Thus, far end crosstalk often originates as near end crosstalk.

This effect will be less marked at the end of the line where Consumer Premises Equipment (CPE) is located. Here, the line termination and DSL modem will be some distance from a bundled cable and other, co-linear, DSL signals, which gives the strong signals from the modem some distance to attenuate before they encounter other DSL signals.

From this, it can be seen that the most logical place to attempt to mitigate the effects of line unbalance and the subsequent occurrence of crosstalk and external noise coupling is at or close to the DSLAM itself.

In most central offices and in all remote terminals, the DSLAM is separated from the distribution frame by only a few meters. The distribution frame is also a very convenient location to connect circuits constructed in accordance with the invention across the telephone pairs, so that is one preferred installation location.

Thus, at the distribution frame, by using circuits constructed in accordance with the invention, the line is balanced and the common mode line impedance is reduced from its previous near infinite impedance to a low impedance. It should be borne in mind that this does not appreciably affect the line's differential mode impedance.

It is also possible to install circuits constructed in accordance with the invention as part of the DSLAM, as an interface attached to the output ports of the DSLAM and also within the cabling that leads from DSLAM to the distribution frame. In fact, any position on the two wire line close to the DSLAM will provide the desired functionality.

Reducing the Undesired Effects

Line Unbalance

Line unbalance is caused by a difference in impedance between the two wires of the line. It follows that, in order to rebalance the line, the impedance of each wire, as perceived by the transmitted signal, should be made equal to that of the other wire of the pair.

The impedance mismatch between individual wires of the pair results in a difference of signal amplitude between the wires, the level of amplitude mismatch being directly proportional to the impedance mismatch. This voltage difference may be used to transfer energy to the wire with the lower amplitude signal. This energy may originate either from the wire with the higher amplitude signal or from an electronic circuit designed to provide such a matching voltage.

In circuits constructed in accordance with the invention, the signal amplitude in the wires can be significantly rebalanced and the line impedance equally rebalanced.

Using Line Pair Voltage Differential to Achieve Rebalance

FIG. 3 shows a twisted pair line 110 constructed of two wires T and R, and a circuit 100 that can be used to balance the line 110. Note that although the twists in the wires T and R are not shown in FIG. 3, it will be understood that these wires are twisted in the conventional manner to form the twisted pair line 110. Circuit 100 includes a transformer 120 made of a first winding 122 and a second winding 124. Circuit 100 also includes an impedance Z1. One end of winding 122 is connected to wire R. The other end of winding 122 is connected both to one end of impedance Z1 and one end of winding 124. The other end of winding 124 is connected to wire T. Finally, the other end of impedance Z1 is connected to ground.

Initially for explanatory purposes, assume that the signals in the two wires of the connected twisted pair, as shown, are perfectly balanced. This is exceptionally unlikely to occur in any real installation, so the following is a hypothetical discussion.

The two signals, one to each wire, are in antiphase to each other, so the voltages developed over the transformer 120 as shown in FIG. 3 will also be in antiphase to each other. Assume further that the signal on wire T is fully positive while the signal on wire R is fully negative, as must happen once per cycle for any cyclical signal. Current will flow from the bottom of the right hand winding of the transformer to the top and from there either through the left hand winding of the transformer to the negative potential on wire R or through Z1 to ground.

However, the magnetic field set up by the current through the right hand winding will couple into the left hand winding and set up an electromotive force in that winding that opposes the flow of current through that winding, causing that winding to appear as a high impedance to currents generated by the negative potential on wire R.

Simultaneously, currents generated by the negative potential on wire R will set up a magnetic field in the left hand winding of the transformer that couples into the right hand winding and that opposes the flow of current from wire T through that winding.

Thus, for perfectly balanced signals, the circuit 100 appears as a very high impedance connected across the line. The circuit 100 will, therefore, have little or no effect on wanted differential signals in the wire pair 110 to which it is connected.

However, should the signal amplitudes in the wires of the pair 110 not be in antiphase equality, the currents induced in the windings of the transformer 120 will not be equal and the magnetic field set up by one winding will not be equal to the magnetic field set up by the other winding.

Under these circumstances, with the windings very closely coupled, the transformer 120 will transfer energy from the winding with the greater magnetic field to the winding with the lesser magnetic field. The transformer 120 is connected so that the voltage induced in the winding with the lesser magnetic field is in phase with the signal in the connected wire. Thus, the energy from the wire with the higher voltage is transferred to the wire with the lesser, antiphase, voltage and voltage balance in the line 110 is improved.

The impedance value of impedance Z1 determines the amount of current which can flow through the windings and thus the strength of the magnetic fields in the transformer 120. If the impedance of Z1 is reduced, then more current can flow and greater rebalance is achieved. Greatest rebalance is achieved as the impedance of Z1 approaches zero ohms.

However, for pure common mode signals, such as may be generated in the wire pair 110 from external sources, the operation of the circuit 100 is to reduce the formation of common mode reflections from the line terminal.

Common mode signals will develop over the windings and generate magnet fields in each winding which, unlike the pure differential mode condition described above, will re-enforce each other and will allow a ready passage of common mode signals to ground via impedance Z1. Under these circumstances, impedance Z1 becomes the perceived impedance to ground for common mode signals. For example, setting the impedance of Z1 to 25Ω will theoretically correctly terminate the line in common mode, however, except where the common mode line impedance exactly matches the theoretical impedance of 50Ω, which is extremely unlikely, the effects of line impedance matching reduce rapidly as the line and terminating impedance increasingly differ. This is shown graphically in FIG. 10.

A zero ohm termination will cause considerable reflections from the line terminal and is, according to the reflection co-efficient equation $((20 \log_{10}((Z1-Z2)/(Z1+Z2)))$, really as bad as an infinite impedance at the line termination. Referring to FIG. 10, it can be seen that unless the match between the line impedance and the terminating impedance is almost exact, the return loss at the junction will reduce rapidly as the two impedances increasingly differ.

Even a few ohms of variation between line common mode impedance and terminal common mode impedance will reduce the return loss significantly. Reduction of return loss will increase the reflection back into the line which leads to standing waves forming in the line.

However, a reduction of the common mode impedance of the line at the terminal will lower the common mode impedance of the line generally, making it, according to the Maximum Power Transfer Theory, less susceptible to EMI. Thus reducing the common mode impedance of the terminal using a circuit constructed according to the invention will reduce the presence of externally generated noise signals on the line. A reduced common mode impedance at the terminal corresponds to an equally reduced level of common mode noise, and therefore, after conversion by residual line unbalance, differential mode noise on the line.

At the same time an improvement in line balance will reduce the susceptibility of the line to external influences and also reduce its ability to radiate into other pairs in any cable bundle of which it forms part. Assuming that both the pair which is the source of any crosstalk and the pair which is picking up the crosstalk are both fitted with circuit 100, it follows that the radiating pair will produce far less radiation, there will be less common mode signal to reflect from the line terminal and that the pair into which the crosstalk might have transferred will be considerably less prone to convert any such common mode signal into differential mode noise.

Referring to FIG. 11, it can be seen that balance improvement increases exponentially as the balance impedance of the circuit decreases. Thus, for lower settings of Z1, for example 1Ω or lower, the improvements in balance and the reduction of the ingress of EMI have a far greater effect than even an exact line impedance match.

Circuits constructed according to the invention, by improving line balance, not only improve the immunity of receiving lines to the effects of crosstalk and external EMI but also reduce the level of radiation from each wire pair to which they are connected. Line sensitivity to interference and propensity to radiate are inversely proportional to the level of line balance, so by improving line balance by, for example, 24 dB, both the sensitivity of a line to external influences and the propensity of a line to radiate into the surrounding medium are also reduced by 24 dB. Since there are two reductions of 24 dB, it follows that the actual reduction of crosstalk is twice this, or, logarithmically, 30 dB.

Thus, while matching the terminating impedance to the line impedance will have an effect on reflections and the reduction of common mode standing waves in the line, line balancing, even at the very narrow band of terminating impedances where the terminating impedance actually matches the line impedance very closely, will have a far greater effect on the performance of the twisted wire pair as a broadband carrying medium This explains in part why circuits constructed according to the invention, which provide line balancing and greater common mode immunity to EMI, provide performance far above what can be provided by prior art approaches such as that of Combellack. It is accordingly advantageous to make impedance Z1 significantly lower than taught by Combellack. For example, making impedance Z1 be one Ohm or less provides performance that is far improved over that of Combellack. Also, as discussed below, it can be advantageous to make Z1 be a variable impedance, which is again, significantly less than that taught by Combellack.

In fact, since the ability of the twisted pairs to radiate is reduced by over 20 dB by line balancing, the level of the voltage peaks at resonant nodes will also be reduced by over 20 dB. Thus, line balancing actually has a greater effect on the amplitude of these voltage resonant nodes than impedance matching.

In an ideal, theoretical world, the transformer 120 shown in FIG. 3 would operate perfectly from lowest voice frequencies to highest DSL frequencies. However, in the real world, transformer behaviour is limited by physical constraints. One of those constraints is that any reasonably priced transformer used at DSL frequencies will not operate correctly at voice frequencies. The impedance of the transformer reduces at lower frequencies until a point is reached, as frequency decreases, where signals begin to break through the transformer and differential mode signals are allowed to pass from wire T to wire R (as shown in FIG. 3), and vice versa, canceling each other and severely reducing the amplitude of the differential mode signal in the line.

To prevent this from happening, two capacitors, C3 and C4 (shown for example in FIG. 5), can be placed in series with the transformer coils. Capacitor impedance increases with decreasing frequency, with the result that, at voice frequencies, a very high impedance, consisting of C3 and C4 in series, will exist between wire T and wire R.

However, since each capacitor is in series with one winding of the transformer, which is an inductor, there will exist a frequency, mathematically $F=1/(2\Pi((LC)\hat{}-2))$, where the series capacitance and inductance will be at resonance and will act as a notch pass filter, allowing a free passage of signals between wires at that particularly frequency.

To overcome this problem, the component values can be chosen such that the notch occurs between 6 and 24 KHz, outside both the DSL frequency range and the voice frequency range. Above and below the notch frequency, the circuit presents a high impedance to all differential mode signals on the line. For example, with the windings of the transformer having an inductance of 470 µH and the capacitors having a capacitance of 100 nF, which will give an overall inductance of 940 µH and an overall capacitance of 200 nF, the notch frequency will be 11.6 KHz, well out of either DSL or voice frequencies. For VDSL and VDSL2 installations, in which the components must be chosen to operate at far higher frequencies, a notch frequency of approximately 80 KHz can be chosen. This occupies another area which is normally unused by any connected equipment.

It is also possible to use transformers with split windings on each side and to insert the capacitors between the windings on each side of the transformer.

Further Explanation of the Effects of Impedance Reduction on Sensitivity to EMI

Maximum Power Transfer theory, a standard theory used throughout electrical engineering, states that maximum power is transferred between a source of electrical energy and a load when the internal impedance of the source matches the impedance of the load.

EMI couples into twisted pairs in common mode. The sources of EMI are seen by the line as relatively high impedance. The impedance of free space is 377Ω, which, while not as high as the common mode terminations on the line, will still allow signals to couple in to the line with relative efficiency. With a high impedance common mode termination on the line, the source impedance is actually lower than the load impedance, meaning that most of the voltage of the signal will develop within the line, due to its high common mode impedance.

This voltage will propagate through the line, converting to differential mode noise due to line unbalance, interfering with wanted signals on the line.

If a circuit constructed in accordance with the invention is connected across the wire pair at or close to the DSLAM, the common mode impedance of the line is reduced to only a few ohms. For example, a radio signal from an AM broadcast received by the line in common mode will have a source impedance, as perceived by the line, of 377Ω. If the line's impedance is reduced by a circuit constructed in accordance with the invention to 1Ω then the majority of the voltage will be developed within the source medium, that is, free space and only 1/377 of the voltage will develop within the line, a reduction of over 50 dB.

However, it should be borne in mind that circuits constructed in accordance with the invention are normally connected to the line close to or at the junction with the DSLAM. (Although, particularly on longer lines, other installation locations are possible and may be beneficial.) Therefore the lowest common mode impedance will be associated with the line immediately adjacent to the DSLSAM and this will slowly increase as the distance from the DSLAM increases. However, it will not increase beyond the intrinsic common mode impedance of the line (nominally 50Ω in North America) so, while the ability of external signals to couple into the line will not be reduced by such extreme amounts further from the DSLAM, even at the furthest point from the DSLAM, where the lines common mode impedance is 50Ω, the ability of external signals to couple into the line is still reduced by 50/377 or 17.5 dB, a significant amount.

In practice, reductions in external interference in real world lines have been measured at between 20 and 35 dB, an expected result.

Thus, with external common mode interference reduced by these amounts by the reduction in line common mode impedance bought about by the connection of a circuit constructed in accordance with the invention to the line adjacent to the DSLAM, the requirement for and effect of common mode line impedance matching is further reduced.

Manually Adjustable Impedance

Since no single twisted pair line is identical to any other twisted pair line, particularly with regard to telephone lines used for various DSL installations, it follows that the value of Z1 in the circuit, if preset for a group of lines, will not provide the best match between line balancing, impedance reduction and, to a lesser extent, common mode impedance matching. Therefore, it can be advantageous to make the impedance Z1 as shown in FIG. 3 adjustable in some way.

FIG. 4 shows a circuit 200. Circuit 200 is similar to circuit 100 (shown in FIG. 3), however in circuit 200 the impedance value of impedance Z1 is manually adjustable so that, when the actual data throughput of the DSL or other broadband system is measured, the highest data throughput for the particular connected line can be achieved by adjustment of Z1.

Any variable resistance can be used here, although one preferred choice for manually adjustable impedance Z1 is a multi-turn cermet potentiometer, with a maximum resistance of about 10Ω.

Dynamically Balancing the Line

FIG. 5 shows a circuit 300 constructed according to the invention. Circuit 300 attaches to a twisted pair line at points T and R. That is, one wire of the twisted pair line attaches to circuit 300 at point T and the other wire of the twisted pair line attaches to circuit 300 at point R.

Circuit 300 operates to balance the twisted pair line automatically and dynamically, measuring the DSL signal amplitudes on the wires of the wire pair and generating a synthetic impedance which will take the place of Z1 in the above described circuit.

In circuit 300, Z1 is replaced by R7, a 10Ω resistor. The non inverting inputs of U1A and U1B are connected to the line via capacitors C1 and C2. The non inverting inputs of U1 present a very high input impedance to the signals on the line, preventing the loading of the line by the overall circuit.

The outputs of U1 are connected to two amplifiers, U3A and U3B. U3B forms the first stage of an RMS to DC converter and amplifier whose eventual output is used to control the gain of U3A.

The operation of this circuit is as follows:

Should the line be perfectly balanced, the transformer, TX1 will provide a very high impedance to the differential signals on the line and, at the same time, the antiphase signals from the wires will cancel at the inverting input of U3A and the non inverting input of U3B. However, any difference in antiphase amplitude between the signals on lines T and R will result in an amplified signal, dependent on the difference between the antiphase amplitudes of the two wires, appearing at the outputs of these two amplifiers, with the signal at the output of U3A being in antiphase to the signal on the wire with the higher amplitude signal.

This antiphase signal is conducted to the non inverting input of U2A, a unity gain non inverting amplifier.

The antiphase difference between the signals on the two wires of the line is in fact a common mode signal and as such it will pass unimpeded through TX1 and be applied to the end of R7 which is connected to the transformer common point. This signal will be in phase with the signal on the wire with the higher amplitude signal. However, since the output of U3A, and therefore U2A, is in antiphase to the common mode signal appearing at the transformer common point, the result of this will be that impedance of R7, as seen by the common mode signal appearing at the transformer common point, will be decreased by an amount dependent on the gain of U3A.

The gain of U3A is dependent on the voltage applied to the gate of J2, a junction FET wired as a voltage controlled resistor. This control voltage is generated in the circuitry following U3B. The operation of this part of the circuit is as follows:

U4A and associated circuitry form a high speed, precision rectifier which will take the broadband signal appearing at the output of U3B and convert it into a positive series of half cycles, each half cycle corresponding to a positive or negative going half cycle appearing at the output of U3B.

U4B is an integrator which, together with the following RC (i.e., resistance capicative) circuit, will average and smooth the output of U4A. U2B is a further integrator which will further smooth the DC voltage which results from the operations of U4.

The output of U2B, a negative DC voltage, is applied to the gate of J2, controlling the resistance of the FET channel. Since both the source and drain of J2 are connected to effective virtual earths, no distortion occurs within the channel of the FET.

From the above it can be seen that, as the line becomes more and more unbalanced, the amplitude of the signal appearing at the output of U3B will increase and the DC control voltage derived from this signal will become more negative. This negative voltage, applied as a control voltage to the gate of J2 will progressively cut off J2, increasing the channel resistance and increasing the gain of U3A. As the gain of U3A increases, the amount of signal fed back to the end of R7 connected to the output of U2A also increases and the impedance of R7, as perceived by the common mode signal at the transformer common point, decreases.

As the perceived impedance of R7 decreases, the action of the transformer, as described earlier, is to bring the signals on the wires of the line more and more into balance. As this happens both the signal appearing at the output of U3B and the gain of U3A will decrease until a point is reached where the amount of unbalance is just sufficient to maintain the feedback to R7 at a level where the impedance of R7 will provide sufficient rebalancing to maintain the circuit at that point of dynamic balance.

It follows from this that the gain of the negative feedback loop involving U3A and U2A determines the level of balance achieved by the circuit and, since the gain of U3A is governed by the voltage on the gate of J2, that the gain of the circuit involving U3B, U4A, U4A and U2B which supplies that voltage determines the level of balance achieved by the overall circuit.

With the component values shown on FIG. 5 a rebalancing of over 35 db is achieved. Obviously, other rebalancing values can be achieved simply by varying the gain of, for example, U2B, which is a DC amplifier.

Thus, this circuit provides a means to achieve any desired level of line balancing, dynamically and automatically.

Summarizing, the operation of the circuit shown in FIG. 5, if the line is in perfect balance, the output of U3A will be zero. However, if the line is out of balance, the output of U3A will be non-zero. For example, if the instantaneous voltage of wire T is −2.0 Volts and the instantaneous voltage of wire R is 2.1 Volts, then the instantaneous value of the inverting input to U3A will be 0.1 Volts (i.e., the sum of the voltages on T and R). The output of U3A will be an inverted and amplified version of this input (i.e., in this example, the output of U3A will be 0.1 Volts times a negative scale factor, where the scale factor is determined by J2). This output of U3A is then applied via U2A to the bottom of R7. R7 provides a synthetic impedance to the signal at the top of R7 (i.e., at point 115). If the voltages at the top and bottom of R7 are equal, then a signal at the top of R7 perceives R7 as an infinite impedance. On the other hand, if for example the instantaneous voltage at the top of R7 is 0.1 Volts and the instantaneous voltage at the bottom of R7 is −10 Volts, then the signal at the top of R7 will perceive R7 as a very small resistor. The circuit shown in FIG. 5 operates so that imbalanced signals in the line perceive R7 as a very small resistor whereas balanced signals in the line perceive R7 as an infinite or very large resistor.

Dynamic Line Balancing without a Transformer

FIG. 6 shows a circuit 400 constructed in accordance with the invention. Unlike the circuits shown in FIGS. 3, 4, and 5, circuit 400 does not include a transformer. Like circuit 300 shown in FIG. 5, circuit 400 automatically adjusts the circuit's perceived impedance to common mode signals.

The circuit 400 is connected to the line via C1 and C2, two 3.3 μF capacitors. As in the circuit shown in FIG. 5, U1A and U1B are voltage follower buffers, used to present a very high impedance to the line from this portion of the circuitry.

However, in circuit 400, the outputs of these two buffers are connected, via R10 and R13 respectively, to the non-inverting inputs of U2A and U2B, unity gain non-inverting amplifiers.

The outputs of these two amplifiers are connected to R7 and R8, respectively. The other ends of R7 and R8 are connected to the line via C1 and C2. It follows that, for all signals on the line, the signals and therefore the voltage amplitude appearing at each end of R7 will be identical and therefore no current will flow through R7, which will appear as an effectively infinite impedance to the signals on the line wire to which it is connected.

An identical situation pertains to R8.

The remainder of the circuit is identical to the previously described circuit 300 shown in FIG. 5, except that U3A's output is connected to both U2A and U2B via R9 and R14 respectively.

Since the output of U3A is in antiphase to the signal on the line wire on which the higher amplitude signal exists and is in phase to the signal on the line wire on which the lower amplitude signal exists (assuming an unbalanced line and line signal), it follows that the application of this signal to the wires of the pair via R7 and R8 will have the effect of reducing the amplitude of the signal on the wire where the higher amplitude signal exists and increasing the amplitude of the signal on the wire where the lower amplitude signal exists, moving the signal on the line toward balance.

As this occurs, the signal amplitudes appearing at the outputs of both U2A and U2B will decrease, reducing the relative level of balancing signal applied via R7 and R8.

Again, it can be seen that the level of balance restoration which occurs is dependent on the gain of U3A which in turn is dependent on the gain of the control voltage generating chain of U3B, U4A and B, U2B and associated components. By altering the gain of this loop, the level of line balance restoration can be determined.

At the same time, in the event of a pure or mainly common mode signal appearing on the line, the output of U3A will be in antiphase to that common mode signal, since the common mode signal will be isolated at the inputs of U3A and B which will adjust the gain of the overall circuit depending on the amplitude of the common mode signal.

The isolated and amplified common mode signal will be fed back in antiphase to the non line ends of R7 and R8, reducing their perceived impedance by an amount depending on the gain of U3A. This will reduce the perceived common mode impedance of R7 and R8 to less than an ohm, making the circuit an effective virtual ground to common mode signals on the line.

The circuit is designed to react to high amplitude common mode signals quickly enough that such signal's rise time is longer than the reaction time of the circuit and the common mode signals are severely reduced in amplitude.

As this happens, the lowered common mode impedance will be applied to the wire pair, lowering its common mode impedance in turn and, by the operation of the Maximum Power Transfer Theory, severely reduce the ability of external EMI to couple into the line in common mode thereby, in turn, reducing the level of noise on the line.

Since this circuit is not dependent on the reactance of a transformer at lower frequencies, a larger capacitor can be used, extending the operation of this circuit into lower frequencies, for example, the voice frequency operations of telephone companies, where the conferred noise immunity will apply to such interferers as metallic noise from interfering power cables and voice frequency crosstalk.

The values of the line connection capacitors are chosen to provide a high impedance to, for example, 20 Hz ringing voltages and off hook DC signaling.

Summarizing the operation of the circuit shown in FIG. 6, two different input signals drive the non-inverting input of U2A. The first of these is applied via R10 and the second of these is applied via R9. The R10 input insures that a component of the output generated by U2A is equal to the signal on the wire R. This allows R7 to in effect provide an infinite impedance to wanted signals on wire R. The R9 input insures that another component of the output generated by U2A is an inverted and amplified sum of the signals on the wires T and R. If the line is in perfect balance, then the sum of the signals on the wires T and R will be zero, and this second component of the output of U2A will also be zero. However, if the line is out of balance, then this second component will (a) reduce the signal on the wire R when the signal on the wire R has a magnitude greater than that of the signal on wire T and (b) increase the signal on the wire R when the signal on the wire R has a magnitude less than that of the signal on wire T. U2B of course behaves in a similar fashion (e.g., having two input signals, one applied via R13 and another applied via R14). So, R7 and R8 provide synthetic resistances to the signals on the wires T and R. When the line is balanced, the line perceives resistors R7 and R8 as providing infinite or very large impedances. However, when the line is unbalanced, the circuit attenuates the signal on the wire (i.e., T or R) which has the greater magnitude and increases the magnitude of the signal on the other wire, so as to balance the line.

Alternative Method of Automatic Line Balancing Using the Principles Previously Described FIG. 7 shows a simplified version of FIG. 5. This circuit takes advantage of the fact that the signal which appears at point 115 will be in phase with the signal on the wire with the higher amplitude signal and will be the anti-phase difference between the two signals.

The signal from point 115 is buffered by U3 and is conducted from the output of U3 to the inverting input of U1, an inverting amplifier whose gain is controlled by control voltage G, a negative going DC voltage used to control the channel resistance of J1, a field effect transistor used as a voltage controlled resistance. As in the circuit shown in FIG. 5, the more negative the voltage on the gate of J1 becomes, the greater the resistance of J1's channel and the higher the gain of U3A will become.

U2, a unity gain non-inverting amplifier, has two non-inverting inputs, one of which is connected to the output of U3. If this loop is considered by itself, it can be seen that it forms a positive feedback loop such that the instantaneous voltages that appear on each side of R8 will be identical so that R8 will appear as an effectively infinite impedance to signals at point 115.

However, U3 is used to provide an inverted version of the same signal to the other non-inverting input of U2. The effect of this will be to subtract the signal from the outputs of U1 from the signal from the output of U3, reducing the amount of positive feedback to R8 and reducing its impedance as seen from point 115.

If U1 has a gain of 1, then both non inverted and inverted signals applied to the inputs of U1 will be equal and there will be no signal output from U2. Under these circumstances, R8 will be seen as having its own intrinsic resistance to a virtual earth provided by the output of U2, and will appear, in this example, as a 10Ω impedance to any signal at point 115.

As the gain of U1 increases, the apparent impedance of R8 will continue to decrease. If, for example, U1 has a gain of ten, R8 will appear as an impedance of 1Ω to signals at point 115. If U1 has a gain of 20, R8 will have an apparent impedance of 0.5Ω.

$Z_{R8} = R8/G_{U1}$

In general, the apparent impedance of resistor R8, $Z_{R8}$ is equal to the intrinsic resistance of R8 divided by the gain of U1 (i.e., $R8/G_{U1}$).

The control voltage used to control the channel resistance of J1 and therefore the gain of U2 can be generated as described for FIG. 5. This method, while convenient and economical, is not the only method by which such a control voltage may be generated and a further method is given here, by way of example.

Alternate Method of Control Voltage Generation

FIGS. 8 and 9 show alternative circuits that may be used to generate the control voltage G for use in the circuit shown in FIG. 7. In this method, a measurement of the impedance of each of the wires of the pair is undertaken and the difference between those impedances used to generate the control voltage.

301 is a 24 KHz sin wave oscillator. This frequency is chosen as being slightly below the lowest DSL frequency but still at a frequency where the line wires, T and R, will react similarly to the manner in which they would react to a DSL frequency signal. The output of this oscillator is buffered by 302 and 303, two voltage follower buffers, and applied, via 310 and 311, analog switches and 312 and 313, current sensing circuits.

The greater the impedance of the wire to which either 313 or 312 are connected, the lower the current that will flow through the current samplers and the greater the output of the relevant current sampler will be. This output will take the form of a 24 KHz sin wave; an actual sample of the signal applied to the individual wires.

The enable input will be applied to the gates of the analogue switches, enabling the circuit. In this particular example of control voltage generation, by operating the enable input, the system controller can, if required, allow the system to follow any variations in wire impedance over time or lock the circuit to one set control voltage and therefore balance level.

The output of the current samplers is conducted via analog switches 314 and 315 to 320 and 321 respectively. These are accurate 24 KHz filters. Any high stability notch pass filter can be used here. This is followed by 330 and 331 respectively, RMS to DC converters which will produce a DC equivalent to the amplitude of the filtered samples.

The levels of these DC voltages are compared in 340, a voltage comparator whose output, a DC voltage equal to the difference between the DC voltages applied to its inputs, will be applied to 341, a window discriminator.

The purpose of the window discriminator is to ensure that the entire system does not "hunt" around the point where the output of the voltage discriminator approaches and passes zero, reverses direction and again passes zero. By providing a narrow voltage band, for example, zero plus or minus 5 millivolts, in which the window discriminator produces no output, the circuit can be locked until such time as the line balance level alters sufficiently to bring the voltages presented to the window discriminator out of the preset window.

If the input to the window discriminator is outside the no output voltage window, the output of 341 will be either a digital 1 to 350 or a digital 1 to 351. 350 and 351 are analog switches (or 2 input and gates) used to control the flow of a clock signal to the following binary counter. (described below)

The clock signal is generated from the 24 KHz signal, squared in 360 and divided by 16 in 361, giving a square wave output at a frequency of 1500 Hz, which is used to clock the rest of the control voltage generating circuitry.

It will be seen that the two clock signals are labeled "count up" and "count down".

FIG. 9 shows a second stage of this control voltage generation, circuit. 401 is a ten bit presetable up/down counter. Other numbers of bits can be used, with accuracy of balance increasing as the number of bits in the counter increases. The purpose of the preset inputs will be explained later. Clock signals from L or M cause the counter to count up or down. As this happens, the analog switches, 402, are opened or closed in a standard binary count starting with, assuming an up count clocked in on L, 0000000000, proceeding to 0000000001, then 0000000010, 0000000011, 0000000100, etc. If the clock has been switched by the preceding stage to M, the counter output will be a series of decreasing ten bit binary numbers.

404 is an R/2R ladder network. +12 volts is connected to the left hand end of the network. Each "rung" of the ladder will decrease the voltage applied to the connected analog switch via the relevant 100 KΩ resistor by 50%.

This series of voltages, each reduced by 50% from the previous voltage on the ladder are connected and disconnected from the negative going input of 403, an inverting, summing amplifier, the they will be summed and the output of 403 will become more or less negative accordingly.

The feedback resistor on 403 is set to 24 KΩ, which is chosen to ensure that the output of 403 varies from 0 volts (all analog switches open, count 0000000000, to −3 volts, all switches closed, count 1111111111.

J1 (FIG. 7) has a cut off voltage of −3 volts and at a gate voltage of 0 volts will have a channel resistance which will be as low as possible. Therefore, as the output of 403 varies, the gain of U1 (FIG. 7) varies and the level of balance varies.

As the level of balance improves, the signal amplitude difference in the wires of the pair will decrease until a level of balance is achieved where the voltage applied to the input of 340, the window discriminator, falls within the voltage window, neither output of 340 is high and no clock signal is connected to the 401, the ten bit up down counter. At this point and as long as the amplitudes of the signals in the wire pair remain at the achieved level of balance, the circuit will be effectively locked and all change ceases.

The preset inputs are used to set the counter to a predetermined binary output where the circuit will achieve a preferred level of balance.

The above descriptions of the invention are not intended to be an exclusive list and other methods of achieving line signal balance according to this invention are both possible and extant.

Applications of the Invention

The invention may be used in several different circumstances. These include, but are not limited to the following:

1. Retrofit installation at or close to the DSLAM port of an existing DSL installation in order to improve the performance of that installation, allowing the customer to receive data at a higher speed or to enable previously out of range customers to be connected. Since the Main Distribution Frame (MDF) is generally within a few meters of the DSLAM, many of these installations will simply be connected across the relevant telephone line at the MDF. This will have the effect of reducing noise on the line in all the ways described in this disclosure.

2. Installation as a silicon chip on the DSLAM printed circuit board (PCB). This is an Original Equipment Manufacturer's use of the circuit and involves implementing the circuit as an integrated circuit. This use will provide all the functionality of the retrofit installation while not requiring any more equipment to be installed in the Central Office.

3. In a home installation for any DSL installation except G-Lite (ITU G.992.2), a modem is required at the point where the telephone wire pair enters the premises. This modem will normally include a voice filter which separates the DSL signal from the Voice Frequency (VF) telephone signal. The separated VF signals will use the existing telephone wiring to connect to telephone instruments etc. while the DSL signal will be conducted to the DSL modem. From there, it is conducted, normally using Ethernet protocol and Category 5 cabling, to the PC, television, router or other DSL enabled equipment. While category 5 cable is relatively immune to impulse noise, it is expensive and its installation is also expensive and time consuming. By adding a line balancing circuit as herein disclosed to the modem at the point where the wires to the connected DSL enabled equipment leave the modem, impulse noise immunity can be enhanced to the point where the use of Category 5 cabling is no longer required and ordinary house telephone wiring can be used instead. In most cases, this wiring will already exist, further reducing the installation cost.

4. Further uses of the product include reduction of noise in Ethernet installations, particularly in noisy factory and mining operations, an intrinsically safe version used to remove high induced voltages and reduce noise on cables used in petrochemical installations, particularly in offshore drilling and processing installations, and as a means for reducing the radiation of sensitive data from twisted pair conductor installations generally.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A circuit for balancing a twisted pair line, the twisted pair line including a first wire and a second wire, the first and second wires being twisted together, the circuit including:
   A. a transformer including a first winding and a second winding, a first end of the first winding being coupled to the first wire, a first end of the second winding being coupled to the second wire, a second end of the first winding being coupled to a second end of the second winding;
   B. an impedance element, a first end of the impedance element being coupled to the second ends of the first and second windings, a second end of the impedance element being coupled to ground, the impedance element being characterized by an impedance of less than ten Ohms.

2. A circuit according to claim 1, the impedance element being characterized by an impedance of one Ohm or less.

3. A circuit according to claim 1, the impedance element providing an adjustable impedance.

4. A circuit according to claim 1, further including a first capacitor connected between the first winding and the first wire, and further including a second capacitor connected between the second winding and the second wire.

5. A circuit for balancing a twisted pair line, the twisted pair line including a first wire and a second wire, the first and second wires being twisted together, the circuit including:
   A. a transformer including a first winding and a second winding, a first end of the first winding being coupled to the first wire, a first end of the second winding being coupled to the second wire, a second end of the first winding being coupled to a second end of the second winding;
   B. an impedance element having a first end and a second end, the first end of the impedance element being coupled to the second ends of the first and second windings;
   C. a driving circuit coupled to the second end of the impedance element, the driving circuit generating a sum signal representative of a sum of a voltage on the first wire and a voltage on the second wire, the driving circuit generating an output signal by inverting and amplifying the sum signal.

6. A circuit according to claim 5, the impedance element being characterized by an impedance of less than or equal to ten Ohms.

7. A circuit according to claim 5, the driving circuit inverting and amplifying the sum signal by scaling the sum signal by a negative scale factor, the driving circuit increasing a magnitude of the scale factor in response to increases in the sum signal, the driving circuit decreasing the magnitude of the scale factor in response to decreases in the sum signal.

8. A circuit according to claim 7, the impedance element being characterized by a first value, the impedance element presenting an effective impedance substantially equal to the first value to a first signal at the first end of the impedance element when the sum signal is substantially equal to zero, the impedance element presenting an effective impedance that is less than the first value to the first signal when the sum signal is greater than zero.

9. A circuit for balancing a twisted pair line, the twisted pair line including a first wire and a second wire, the first and second wires being twisted together, the circuit including:
   A. a first impedance element having a first end and a second end, the first end of the first impedance element being coupled to the first wire;
   B. a second impedance element having a first end and a second end, the first end of the second impedance element being coupled to the second wire;
   C. a summing circuit coupled to the first and second wires for generating a sum signal representative of a sum of a first voltage in the first wire and a second voltage in the second wire;
   D. a first driver circuit coupled to the second end of the first impedance element, the first driver circuit generating a first output signal, the first output signal having a first component and a second component, the first component of the first output signal being substantially equal to the first voltage, the second component of the first output signal being generated by inverting and amplifying the sum signal;
   E. a second driver circuit coupled to the second end of the second impedance element, the second driver circuit generating a second output signal, the second output signal having a first component and a second component, the first component of the second output signal being substantially equal to the second voltage, the second component of the second output signal being generated by inverting and amplifying the sum signal.

10. A circuit according to claim 9, the first impedance element being characterized by an impedance of ten Ohms or less, the second impedance element being characterized by an impedance of ten Ohms or less.

11. A circuit according to claim 9, the second components of the first and second output signals being generated by scaling the sum signal by a negative scale factor, a magnitude of the scale factor increasing in response to increases in the sum signal, the magnitude of the scale factor decreasing in response to decreases in the sum signal.

* * * * *

UNITED STATES PATENT AND TRADEMARK OFFICE
CERTIFICATE OF CORRECTION

PATENT NO. : 7,728,692 B2
APPLICATION NO. : 11/811143
DATED : June 1, 2010
INVENTOR(S) : John Fortier It is certified that error appears in the above-identified patent and that said Letters Patent is hereby corrected as shown below:

Col. 20, line 55, claim 10, should read as follows:

10. A circuit according to claim 9, the first impedance element being characterized by an impedance ~~often~~ of ten Ohms or less, the second impedance element being characterized by an impedance ~~often~~ of ten Ohms or less.

Signed and Sealed this

Third Day of August, 2010

David J. Kappos
*Director of the United States Patent and Trademark Office*